United States Patent
Campbell et al.

(10) Patent No.: US 10,155,621 B1
(45) Date of Patent: Dec. 18, 2018

(54) SEA CONTAINER BRACKET

(71) Applicant: Precision Maintenance & Fabrication, Charlotte Hall, MD (US)

(72) Inventors: Michael Campbell, Charlotte Hall, MD (US); Marcus Campbell, Charolette, MD (US)

(73) Assignee: Precision Maintenance & Fabrication, LLC, Charlotte Hall, MD (US)

( * ) Notice: Subject to any disclaimer, the term of this patent is extended or adjusted under 35 U.S.C. 154(b) by 0 days.

(21) Appl. No.: 15/530,432

(22) Filed: Jan. 13, 2017

Related U.S. Application Data

(60) Provisional application No. 62/391,269, filed on Apr. 25, 2016.

(51) Int. Cl.
*B65D 90/12* (2006.01)
*B65D 88/12* (2006.01)
*F16M 13/02* (2006.01)

(52) U.S. Cl.
CPC ............ *B65D 90/12* (2013.01); *B65D 88/121* (2013.01); *F16M 13/02* (2013.01)

(58) Field of Classification Search
CPC .... B65D 90/12; B65D 88/121; B65D 88/128; B65D 90/0006; B65D 90/0026; B65D 90/0013; B65D 90/002; B65D 2588/02; B65D 2590/0008; B65D 2590/0016; F16M 13/02; B60P 7/13
USPC ............... 248/500, 311.2, 680, 499, 510
See application file for complete search history.

(56) References Cited

U.S. PATENT DOCUMENTS

| | | | | |
|---|---|---|---|---|
| 3,125,177 | A * | 3/1964 | Paller ................. | F16B 2/06 180/68.5 |
| 4,211,178 | A * | 7/1980 | Peterson ............. | D05B 75/06 112/217.1 |
| 4,382,416 | A * | 5/1983 | Kellogg-Smith ..... | E06C 9/04 114/363 |
| 4,682,923 | A * | 7/1987 | Gerhard ............... | B60P 7/13 410/76 |
| 4,942,975 | A * | 7/1990 | Capron ............... | B65D 90/0006 206/504 |
| 5,813,659 | A * | 9/1998 | Heidle ................. | B66F 7/28 254/199 |
| 2017/0066590 | A1* | 3/2017 | Albanese ............ | B65D 88/022 |

* cited by examiner

*Primary Examiner* — Christopher Garft

(57) ABSTRACT

A sea container bracket includes a means for anchoring a sea container to a dock, a floor or deck surface so as to lock and effectively prevent lateral and/or longitudinal shifting of the sea container relative to such a surface during high winds. More particularly, it relates to a sea container bracket having a unique design which interconnects with current use sea container fittings and locks a sea container to land.

17 Claims, 7 Drawing Sheets

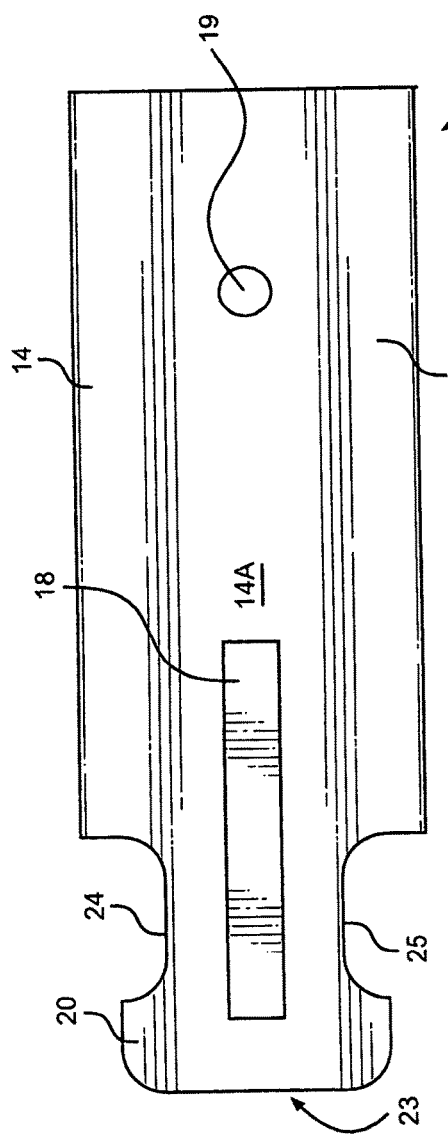
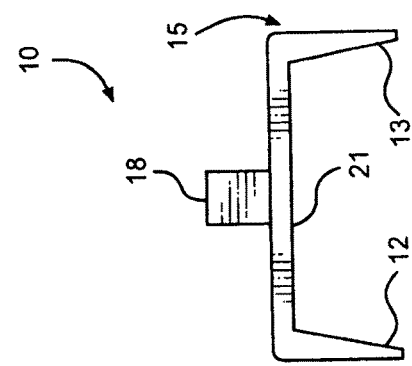
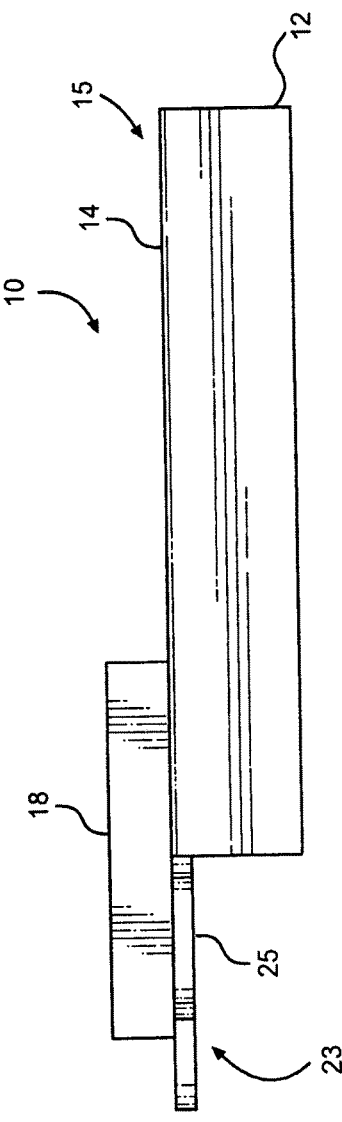
FIG. 2
FIG. 3
FIG. 4

SEA CONTAINER BRACKET

This application claims priority under 35 U.S.C. 119(e) for the benefit of prior-filed provisional application U.S. Provisional Application Ser. No. 62/391,269 filed Apr. 25, 2016, the entirety of which is incorporated by reference.

BACKGROUND OF THE INVENTION

Today, freight handling is known as containerization, a system of intermodal freight transport using intermodal containers (also called shipping containers and ISO containers) made of weathering steel. The containers have standardized dimensions. System employing van size cargo bodies such as sea containers which are transferred from over-the road vehicles to railroads, to loading platforms, to ships, etc. without unloading the container until it reaches its final destination. Such containers are generally equipped with hollow corner fittings having one or more slotted walls whereby the container can be removeably secured to lifting and transporting devices. On a railroad fiat car or on board ship, it becomes necessary to lash the container to the car or ship. Sea containers are used in the shipping industry to transport freight. When a ship reaches land, the sea containers are loaded off the ship and placed on land but somewhat near the water where high winds can move the containers and damage the load.

Typical sea containers include sea container fittings which are particularly adapted for use with freight containers and more specifically with containerized cargo containers. The corner fittings provide the container with the means which allow the container to be lifted or coupled to other containers or secured to surfaces such as ships deck, the floor of a railroad car or the ground. Such containers are commonly in use for hauling freight by ship, rail or air wherein the shipping container itself could form the body portion of a vehicle or the means for holding and stacking material being hauled within vehicles. When constructed in this fashion, the container, while being liftable by twist lug elements, cannot be easily lifted by a conventional lifting hook nor can containers be easily coupled vertically or horizontally.

What is needed in the current industry, is a means for securing or anchoring the sea container to land where high winds can move the containers and damage the load.

BRIEF SUMMARY OF THE INVENTION

This invention further relates to a means for fastening a sea container to land, a floor or concrete deck surface so as to lock and effectively prevent lateral and/or longitudinal shifting of the article relative to such a surface. More particularly, it relates to an improved article-to-surface sea container bracket comprising an integral unique bracket which locks a sea container to land.

It is an object of the invention to provide a sea container bracket used to anchor a sea container to a surface Another object of the present invention to provide a sea container bracket have an elongated hold down member with curved sides for insertion into a sea container fitting.

Another object of the present invention to provide a sea container bracket having a unique shape designed to engage a corner fitting of a sea container.

It is another object of the present invention to provide a plurality of sea container brackets for connection to one or more sea container fittings to lock the container to a supporting surface.

Still another object of the present invention is to provide a sea container bracket with strengthening means integrally formed with an elongated hold down member, Finally it is an object of the present invention to provide a sea container bracket with an elongated hold down member having a curved side surfaces which extend from said top portion into an elongated head portion said elongated head portion, the elongated head portion for insertion on its side an into an oval hole in the corner fitting of the sea container and after insertion, turning said bracket 90 degrees and placing the bracket on the surface with said neck 2 resting on the surfaces of the hole of the corner fitting and thereafter inserting a fastening device through said aperture and driving the fastening device into the ground or the supporting surface to secure the sea container to the surface.

BRIEF DESCRIPTION OF THE DRAWINGS

FIG. 2 is a top plan view of the sea container bracket of the present invention;

FIG. 3 is a side view of the sea container bracket of the present invention;

FIG. 4 is a rear end view of the sea container bracket of the present invention;

DETAILED DESCRIPTION OF THE INVENTION

Figure 5:
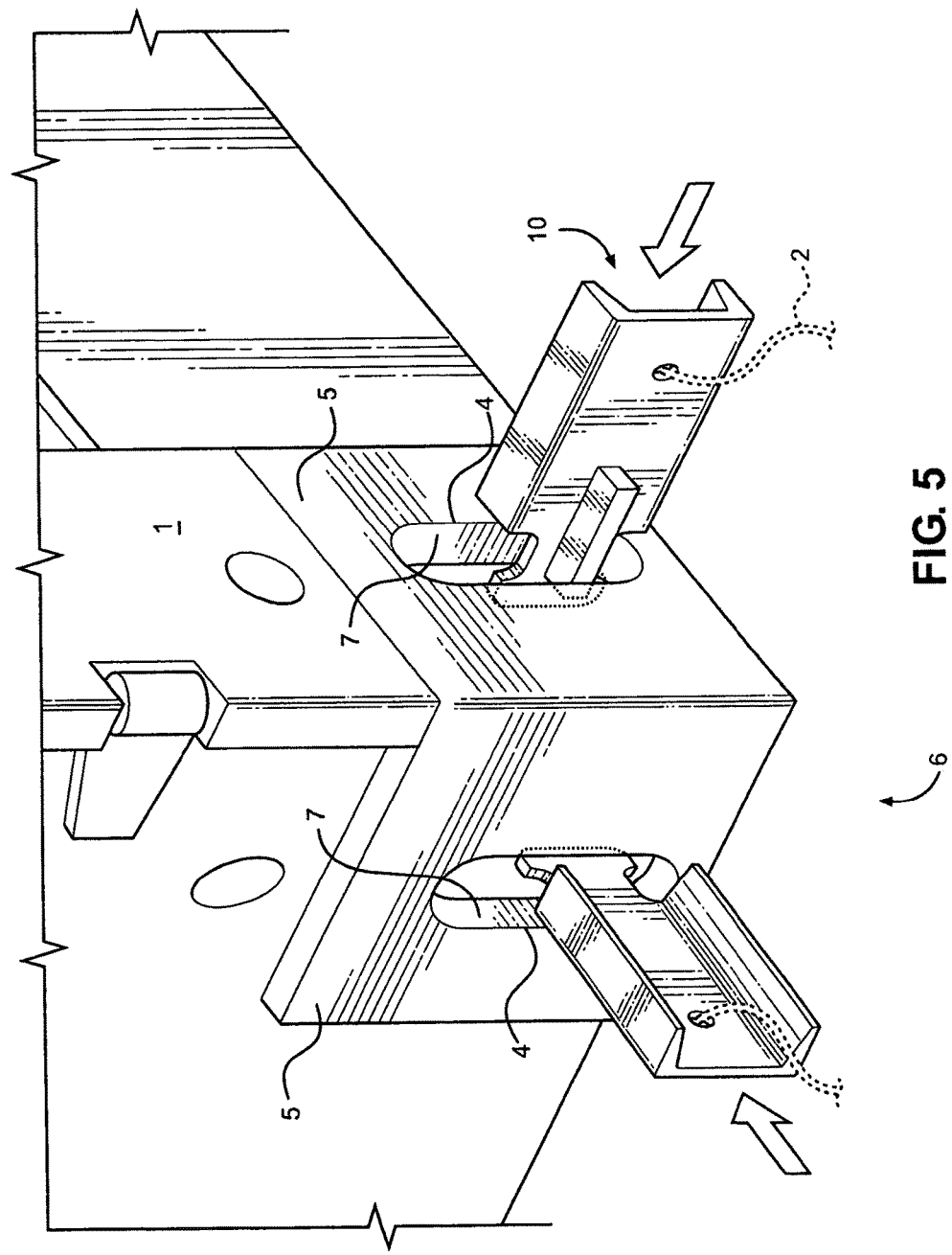
FIG. 5 provides a perspective view of the sea container bracket inserted vertically into a sea container fitting.

In accordance with the present invention and with reference to the drawings, FIGS. 1-5, a sea container bracket 10 is illustrated and described in detail. The sea container bracket 10 is used for insertion into a commonly used sea container fitting 3 in order to anchor a sea container 1 to a surface such as a dock or land when used in combination with a fastening device 2 as shown in FIG. 5. Typically, sea containers 1 include sea container fittings 3 which support the container and can be used to lift and transport sea containers from a ship to a dock. Each fitting 3 is generally hollow and has oval holes 4 elongated in a vertical direction on exposed sides 5.

Figure 1:
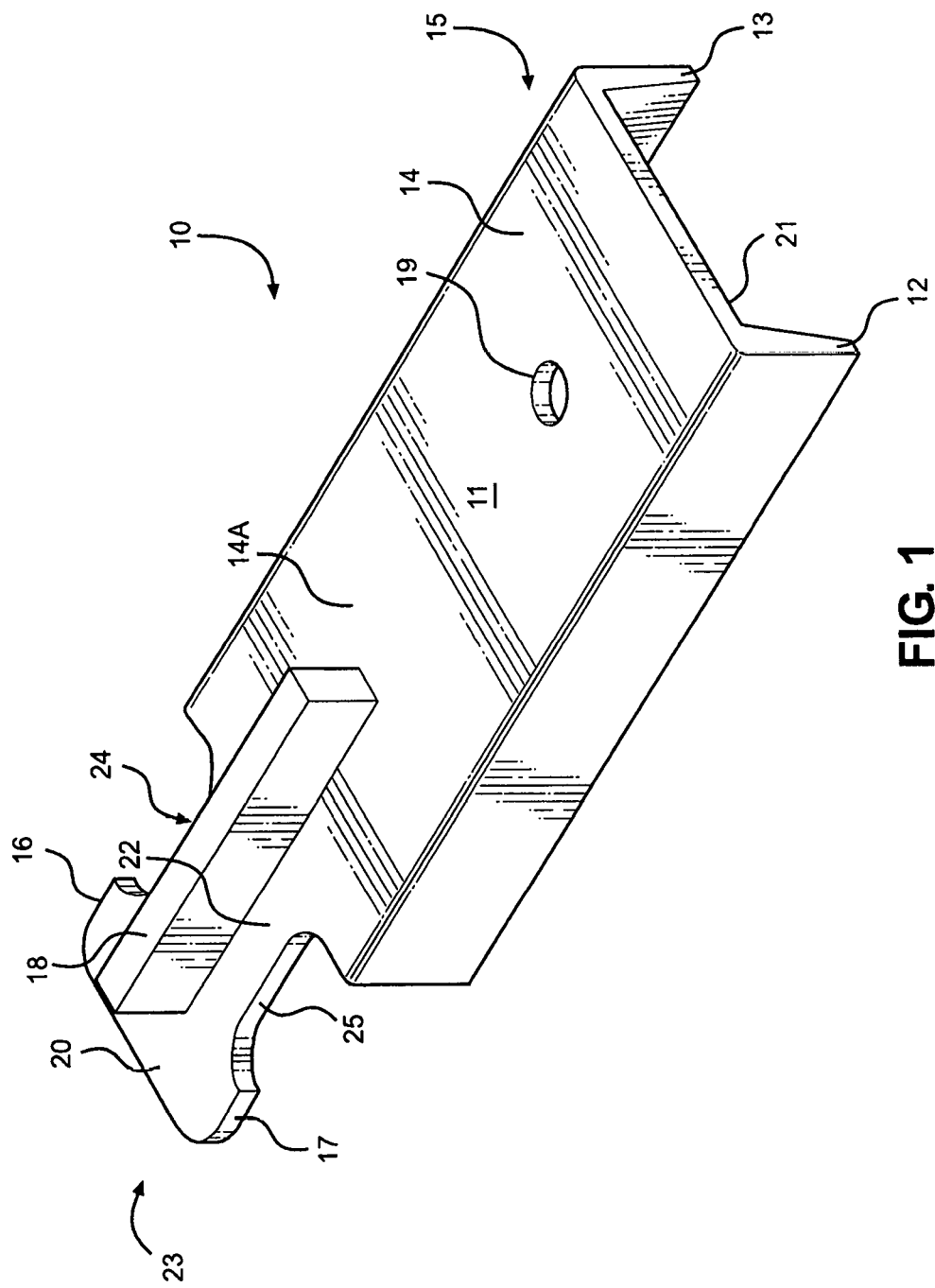
FIG. 1 is an isometric view of the preferred embodiment of the present support bracket invention.

A sea container bracket 10 of the present invention is illustrated in FIG. 1. The sea container bracket 10 is made of any ceramic or metal, or steel material but preferably carbide steel with a mass density of 0.283599 lbmass/in^3, a yield strength of 50763.2 psi, and an ultimate tensile strength of 60915.8 psi. In addition, the stress measurements of the sea container bracket, produced a Young's Modulas of 29007.5 ksi, a Posisson's ratio of 0.29 ul and a Shear Modulas of 11243.2 ksi. The sea container bracket further has a mass of 4.57992 ibmass, an area of 140.138 in^2, and a volume of 16.1493 in^3. The sea container bracket device typically weighs between 1-3 pounds but could weigh less or more depending on the job requirements. The sea container bracket may be integrally formed and may be produced by an open hearth furnace or if ceramic by any additive manufacturing process. Alternatively, the sea container bracket mat be made of stamped parts and welded together.

Figure 8:
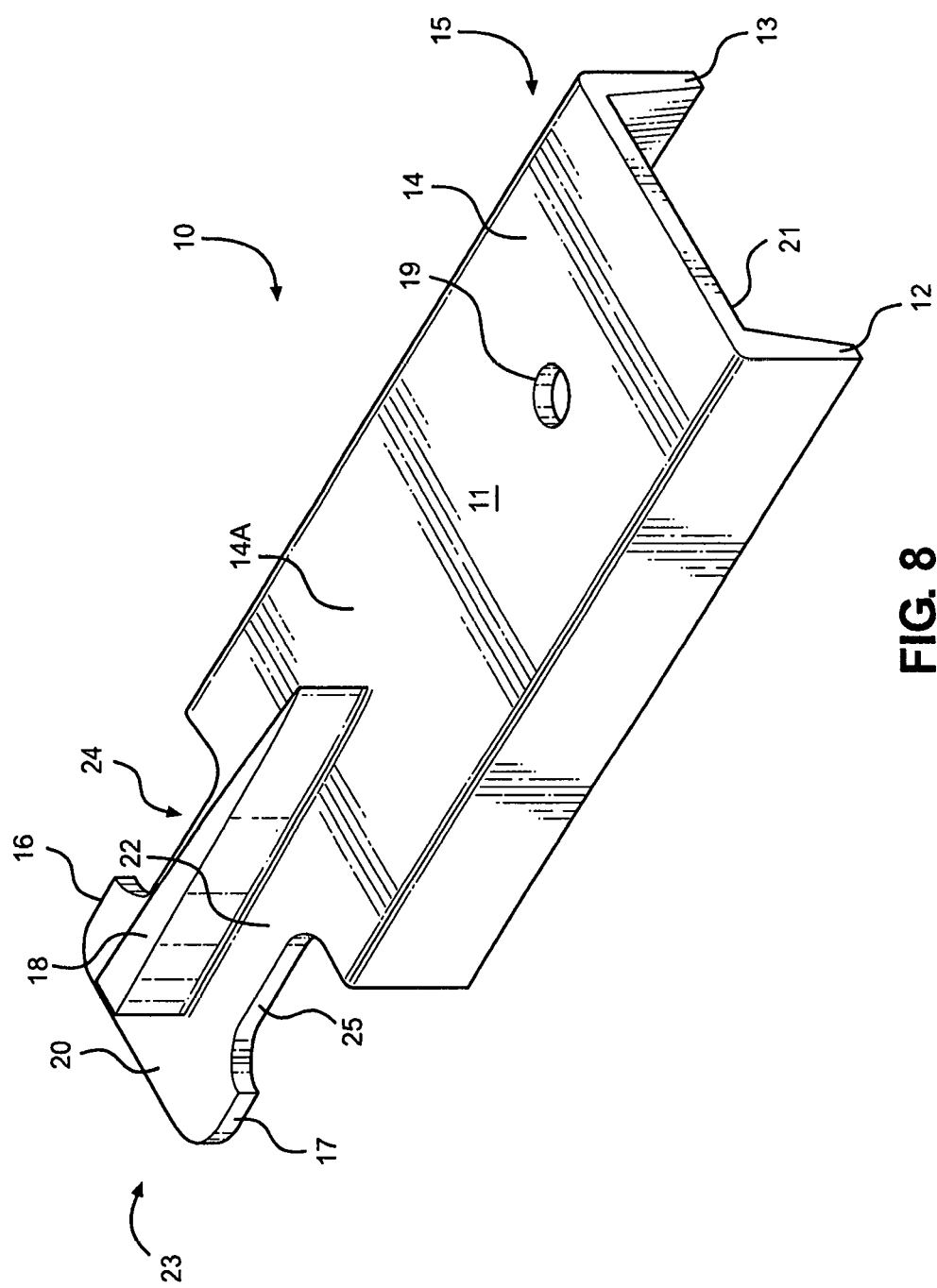
FIG. 8 provides a perspective view of the sea container bracket with a wedge shaped strengthening means.
Figure 9:
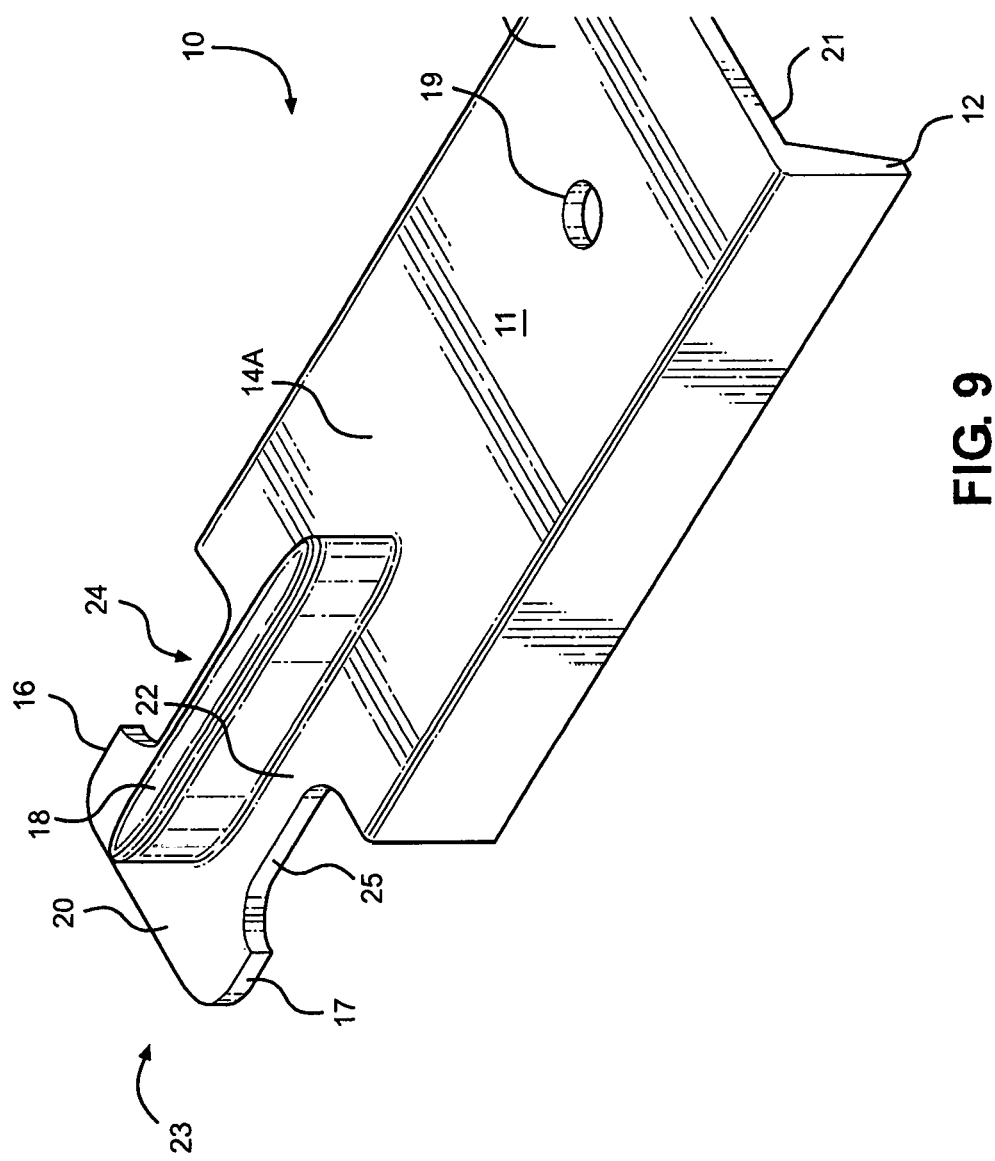
FIG. 9 provides a perspective view of the sea container bracket with a bulbous shaped strengthening means and two apertures.

The sea container bracket includes a U shaped body portion 11 having a first leg 12 and a second leg 13 which rest on the ground or a flat support surface in use. The body 11 further has a top portion 14, a top central section 14a, a rear end 15 and a front end 16. The front end 16 extends the top portion 14 beyond the U shaped body portion 11 and concludes in an elongated hold down member 17. Integrally formed or stamped and welded with elongated hold down member 17 is a strengthening means shown as a support bar 18. The strengthening means may be any additional backing material that adds strength to the sea container bracket such as any bulbous, spheroid or wedge or shaped material adding thickness. (FIGS. 8 and 9) In the preferred embodiment, the support bar 18 adds additional strength to the elongated hold down member 17. Near the rear end 15 through the top portion is an aperture 19. The aperture 19 is used to attach a bolt or fastening device 2 which is driven into the ground or the supporting surface. In the preferred embodiment, the aperture has a circumference between 1-5 inches but could be smaller or larger depending on the size and weight of the sea containers ready for anchoring. Alternatively, there may be two or more apertures depending on the intended use, the size and the weight of the sea container.

As illustrated in FIGS. 2, 3 and 4, the elongated hold down member 17 has a generally flat top 20, a bottom surface 21 and a neck 22 with curved side surfaces 24, 25 which extend from the top portion 14 into an elongated head portion 23. The elongated head portion 23 is designed to be inserted on its side into the oval holes 4 in a corner fitting 3 of the sea container 1. The support bar 18 is located or positioned overlying the elongated head portion 23 and extends from the center of the top portion 14 of the U shaped body portion to the neck 22.

FIG. 5 illustrates a sea container with the sea bracket turned 90 degrees and inserted into a sea container fitting 3. The sea container 1 has four corner fittings 3 (only two illustrated), each corner fitting 3 provided with 2 exposed elongated or oval holes 4. In order to insert the sea container bracket 10, the sea container bracket 10 must be turned to the side then inserted into the opening 4 of the sea container fitting 3.

Figure 6:
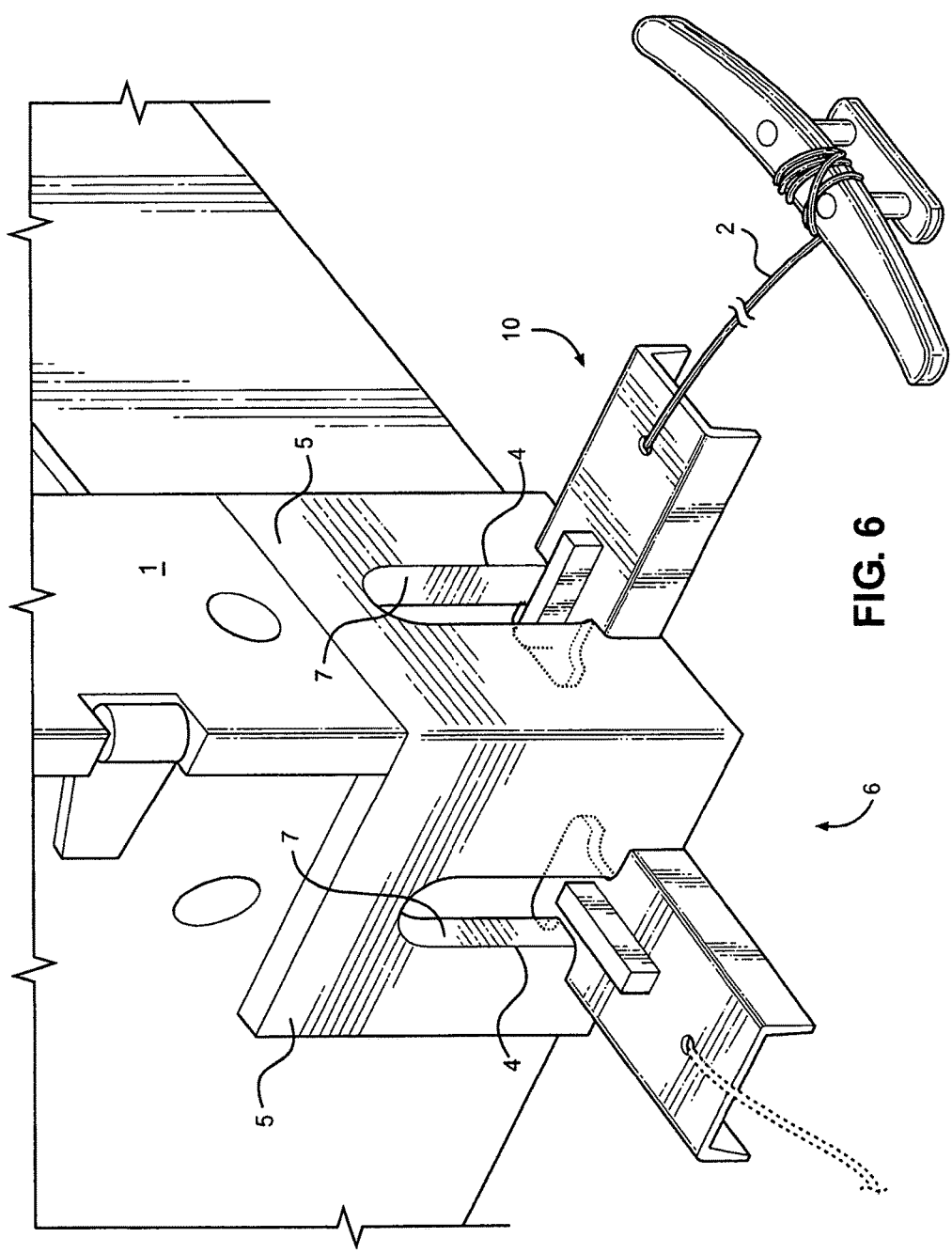
FIG. 6 provides a perspective view of the sea container bracket anchoring a sea container to a cleat of the present invention.

FIG. 6 illustrates the sea container 1 held down by the sea container bracket 10 of the present invention. The sea container 1 has four corner fittings 3 (only two illustrated), each corner fitting 3 provided with 2 exposed elongated or oval holes 4. In order to anchor the sea container to land, the elongated head portion 23 of sea container bracket 10 is inserted on its side into each hole 4 and rotated 90 degrees and placed on the supporting surface 6 such as a dock, land or concrete 6 with the neck 22 through curved side surfaces 24, 25 resting on the corner fitting surface 7 of the corner fitting 3. A fastener or tether 2 is then placed into each aperture and tied to standard sea cleats 8 typically found on docks to anchor the sea container bracket 10 in place securing the sea container 10 onto the surface 6. Any number of sea container brackets 10 can be used to tie down the sea container 1.

Figure 7:
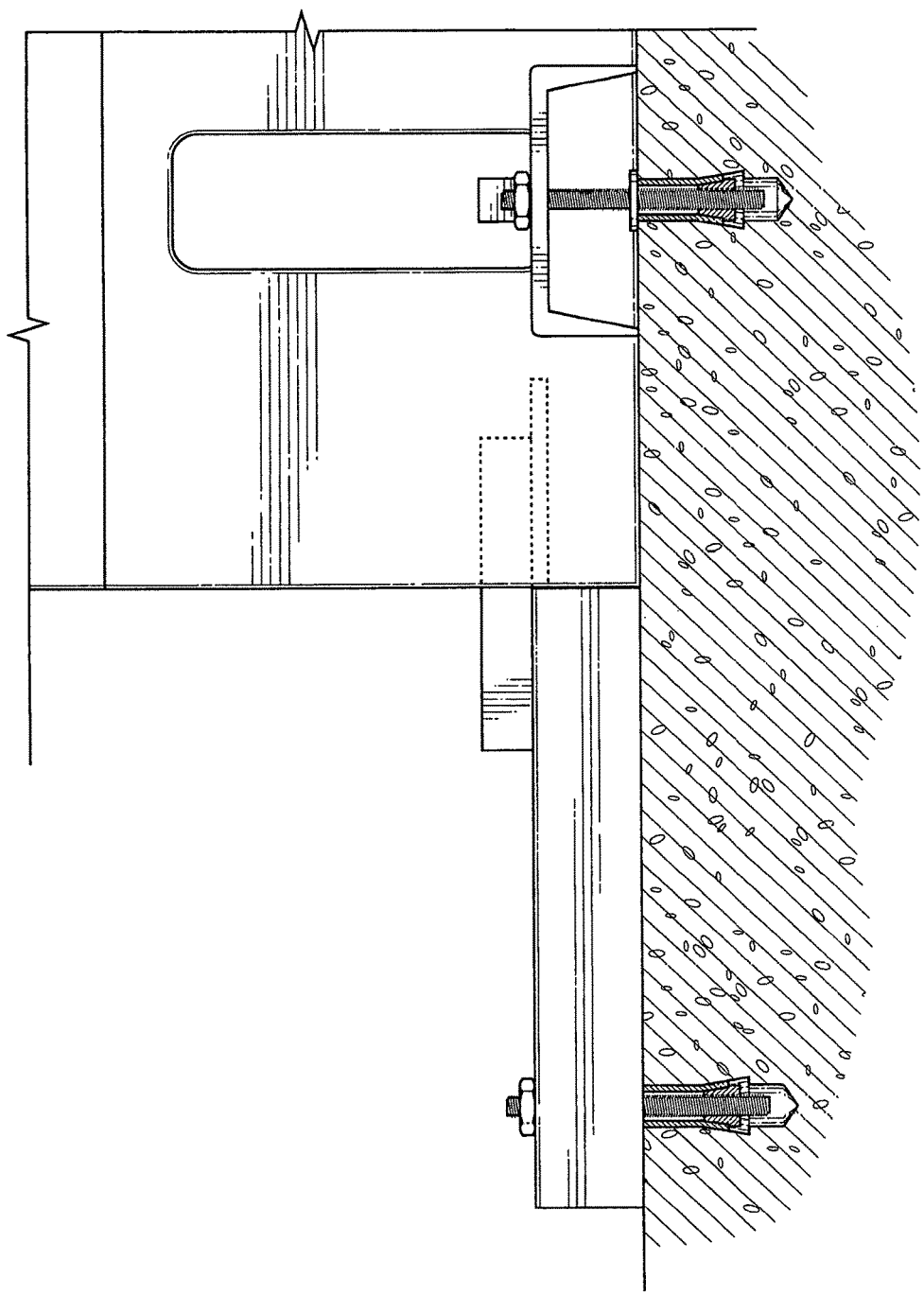
FIG. 7 provides a perspective view of the sea container bracket anchoring a sea container to concrete or cleat of the present invention.

FIG. 7 illustrates another means for anchoring a sea container 1 into asphalt or concrete. In this embodiment, a holes 100 are drilled into concrete or asphalt surface 101 by a hammer drill and lead anchor 102 is placed in the hole 103. A bolt 104 is then inserted into the aperture of the sea container bracket and threaded into the lead anchor 102 expanding the lead anchor 102 outwardly locking the anchor into the concrete and securing the sea container 1 to the ground.

As such, an invention has been disclosed in terms of preferred embodiments and alternate embodiments thereof, which fulfills each one of the objects of the present invention as set forth above and provides a sea container bracket 10 for use on most surfaces. Various changes, modifications, and alterations from the teachings of the present invention may be contemplated by those skilled in the art without departing from the intended spirit and scope thereof. It is intended that the present invention only be limited by the terms of the appended claims.

The invention claimed is:

1. A sea container mounting system comprising:
   an intermodal sea container comprising at least one container fitting having a hollow oval hole elongated in a vertical direction;
   a sea container bracket for insertion into the hollow oval hole in order to anchor the intermodal sea container onto a surface; said sea container bracket provided with a U shaped body portion; said U shaped body portion having a first leg and a second leg; said first leg and said second leg resting said surface in use; said U shaped body portion having a top portion with an aperture, a top central section, a rear end and a front end; said front end extending from said top portion beyond said first leg and said second leg; said sea container bracket further comprising an elongated hold down member and a neck; said neck having curved side surfaces which extend in a horizontal direction; said sea container bracket further comprises a support bar positioned on said top portion extending from said top portion of said U shaped body to the elongated hold down member for providing added strength to the sea container bracket; and
   wherein said sea container bracket is secured to said intermodal sea container by passing said neck and said elongated hold down member into the hollow oval hole, resting said first leg and said second leg on said surface and securing said sea container bracket to said surface via said aperture.

2. The sea container mounting system as recited in claim 1, said sea container bracket made of carbon steel.

3. The sea mounting system as recited in claim 1, said sea container bracket integrally formed of the same material.

4. The sea container mounting system as recited in claim 1, said sea container bracket weighing between one and three pounds.

5. The sea container mounting system as recited in claim 1, wherein said aperture has a circumference between 1 and 5 inches.

6. The sea container mounting system as recited in claim 1, said sea container bracket further having a Shear Modulus of 11243.2 ksi.

7. A sea container mounting system comprising:
   an intermodal sea container comprising at least one container fitting having a hollow oval hole elongated in a vertical direction;
   a sea container bracket for insertion into the hollow oval hole in order to anchor the intermodal sea container onto a surface; said sea container bracket provided with a U shaped body portion; said U shaped body portion having a first leg and a second leg; said first leg and said second leg resting on said surface in use; said U shaped body portion having a top portion with an aperture, a top central section, a rear end and a front end; said front end extending from said top portion beyond said first leg and said second leg; said sea container bracket further comprising an elongated hold down member and a neck; said neck having curved side surfaces which extend in a horizontal direction; said sea container bracket further comprises a strengthening means integrally located on said top portion extending from said top portion of said U shaped body to the elongated hold down member for providing added strength to the sea container bracket; and wherein said sea container bracket is secured to said intermodal sea container by passing said neck and said elongated hold down member into the hollow oval hole, resting said first leg and said second leg on said surface and securing said sea container bracket to said surface via said aperture.

8. The sea container mounting system as recited in claim 7, said sea container bracket made of carbon steel.

9. The sea mounting system as recited in claim 7, said sea container bracket integrally formed of the same material.

10. The sea container mounting system as recited in claim 7, said sea container bracket weighing between one and three pounds.

11. The sea container mounting system as recited in claim 7, wherein said aperture has a circumference between 1 and 5 inches.

12. The sea container mounting system as recited in claim 7, said sea container bracket further having a Shear Modulus of 11243.2 ksi.

13. The sea container mounting system as recited in claim 7, said said neck having curved sides.

14. The sea container mounting system as recited in claim 7, said sea container bracket attachable to concrete by a bolt and lead anchor.

15. The sea container mounting system as recited in claim 7, said sea container bracket attachable to a cleat by a tether.

16. A sea container mounting system comprising:

an intermodal sea container comprising at least one container fitting having a hollow oval hole elongated in a vertical direction;

a sea container bracket for insertion into the hollow oval hole in order to anchor the intermodal sea container onto a surface; said sea container bracket provided with a U shaped body portion; said U shaped body portion having a first leg and a second leg; said first leg and said second leg resting on said surface in use; said U shaped body portion having a top portion with an aperture, a top central section, a rear end and a front end; said front end extending from said top portion beyond said first leg and said second leg; said sea container bracket further comprising an elongated hold down member and a neck; said neck having curved side surfaces which extend in a horizontal direction; and wherein said sea container bracket is secured to said intermodal sea container by passing said neck and said elongated hold down member into the hollow oval hole, resting said first leg and said second leg on said surface and securing said sea container bracket to said surface via said aperture.

17. The sea container mounting system as recited in claim 16, said sea container bracket weighing 1-3 pounds.

* * * * *